Feb. 14, 1933.    C. A. WINSLOW    1,897,746
EXHAUSTING SYSTEM FOR HYDROCARBON ENGINES AND THE LIKE
Filed Nov. 28, 1927
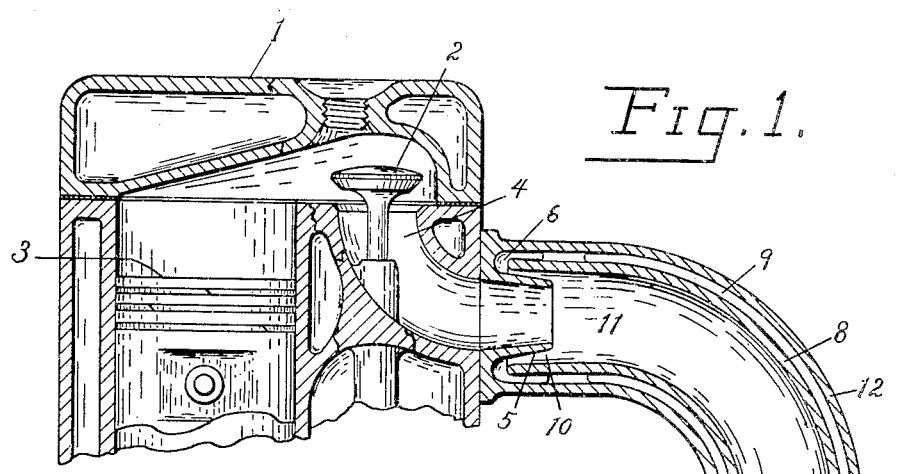
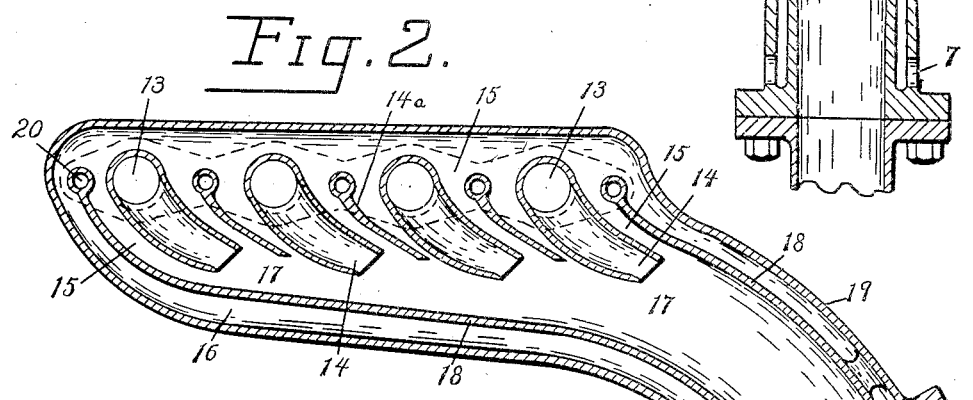
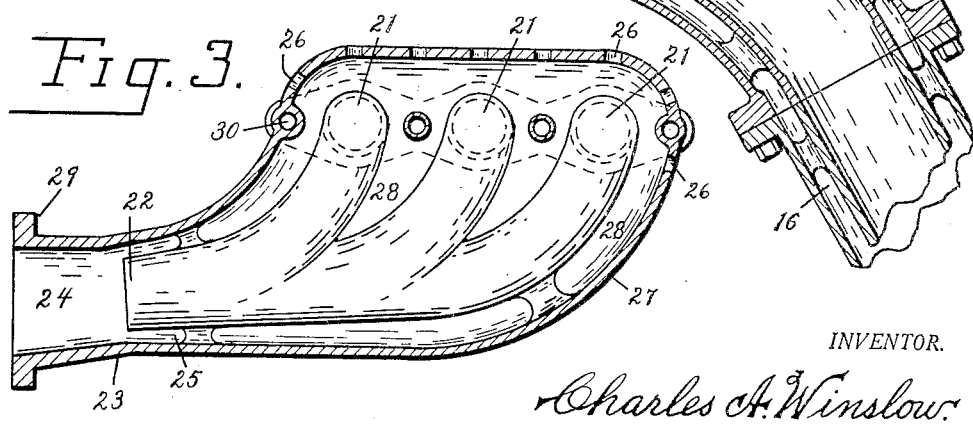
INVENTOR.
Charles A. Winslow.

Patented Feb. 14, 1933

1,897,746

UNITED STATES PATENT OFFICE

CHARLES A. WINSLOW, OF VALLEJO, CALIFORNIA

EXHAUSTING SYSTEM FOR HYDROCARBON ENGINES AND THE LIKE

Application filed November 28, 1927. Serial No. 236,234.

The present invention relates to improvements in exhausting systems for hydrocarbon engines and the like whereby the danger from exhaust gases is greatly reduced.

In the past, CO gas from the exhaust of hydro-carbon engines has caused great danger to life and vegetation in cities, towns and even on much traveled highways or wherever motor vehicle traffic has been congested. Another great danger in the past has been the fact that the exhaust gases from the ordinary hydro-carbon engine constitute a dangerous condition when the engine is allowed to operate in a garage or closed room or in a tunnel. This invention has for its object the dilution and burning of these gases before they are allowed to leave the exhaust pipe from the vehicle to which the invention may be attached. Many attempts to eliminate dangerous exhaust gases have been made in the past, but to my knowledge none has been successful enough to come into general use, because they were entirely too complicated in structure for practical purposes and were not efficient. The system described in this specification is not only practical and simple, but also highly efficient and can be attached to any conventional hydro-carbon engine by simply removing the present exhaust pipe and substituting the present improved exhaust system.

A further object of the invention is to provide an air jacketed exhaust pipe whereby all the air used for combustion is first drawn around the heated exhaust pipe and caused to be intermingled with the gases in a highly heated condition close to their exit from the hydro-carbon engine, thereby diluting the same and aiding in further combustion of the gases to cause a change in the nature of the gas from CO to $CO_2$, and thereby greatly aiding in eliminating the danger of poison from exhaust pipes of hydro-carbon engines.

A further object of the invention is the provision of a jacketed exhaust pipe, whereby air is caused to be drawn over the exhaust pipe and through the jackets surrounding it and tending to cool the exhaust pipe and carry away the heat with the exhaust gases and thus prevent fire hazard from radiated heat from exhaust pipes.

A further object of the invention is the provision of a means of causing a large quantity of air to be circulated through a jacket surrounding the exhaust pipe by scientifically using the kinetic energy stored in the velocity of the exhaust gases through an aspirator arrangement within the exhaust pipe without losing any perceptible amount of the power of the engine to which the invention is attached.

A still further and more specific object of the invention is the provision of a structure permitting burning and elimination of obnoxious elements in the exhaust of hydrocarbon engines by providing means whereby the heat of the exhaust employed to highly preheat air, which is drawn through the casing around the exhaust and into the exhaust pipe at such a point that a secondary combustion of the exhaust gases takes place before the flame of the initial exhaust is permitted to die.

These and other objects I attain by the construction shown in the accompanying drawing, wherein for the purpose of illustration is shown a preferred embodiment of my invention and wherein:—

Figure 1 is a sectional view through the upper parts of a conventional hydro-carbon engine taken at the exhaust valve port and illustrates the invention attached to the same in operative position;

Figure 2 is a section of a modification of the improved exhausting system and illustrates a manifold whereby a number of exhaust ports are directed through nozzles into the exhaust pipe to cause a draft of heated air to be circulated through a jacket surrounding the exhaust, thence intermingled with the exhaust and discharged through the exhaust pipe proper with the gases;

Figure 3 is a partial section through a still further modification of the invention and illustrates compounded exhaust ports directed through a nozzle discharging through the central portion of a jacket surrounding the exhaust pipe and thereby prevents radiated heat from being carried out through the jacket 27 surrounding the exhaust pipe.

Referring now to the drawing and more particularly to Figure 1 thereof, the numeral 1 indicates a conventional hydro-carbon engine, an exhaust valve 2 of which is in the open position and the piston 3 of which is rising so that the exhaust gases are passing through the usual engine port 4. The numeral 8 designates an exhaust conduit leading to the usual muffler and having its terminal portion in slightly spaced relation to the outlet mouth of the port 4. Surrounding this exhaust conduit and at present shown as integrally connected therewith is an outer jacket 12, which extends to and is secured against the wall of the engine about the outlet mouth of the port 4. At this point, the jacket is provided with a revert forming a nozzle 5, which extends into the adjacent open end of the exhaust conduit in spaced relation thereto. This revert is tapered and forms an injector nozzle and the space 10 which is in communication with the atmosphere through the space 6 and the annular conduit 9 formed between the exhaust conduit 8 and jacket 12 through ports 7 formed through the wall of the jacket at the end thereof remote from that engaged with the engine wall.

During operation of this form of the invention, as the piston 3 comes up on the exhaust stroke, hot exhaust gases are forced out through a port 4 to attain a high velocity at the nozzle arrangement 5. This high velocity causes a partial vacuum to exist at the space 6 behind the nozzle and, in turn, causes a draft of air to enter a plurality of ports 7 to be drawn over the heated exhaust pipe 8 through the space 9. As the heated air is drawn upwardly and reversed at the space 6, it is thence drawn into the exhaust pipe proper through the circular space 10 and intermingled with the exhaust gases at a space 11 within the exhaust pipe proper 8. As the heated air intermingles with the exhaust flame leaving the nozzle 5, it has a tendency to cause further combustion of the exhaust gases and change the nature of the gas from $CO$ to $CO_2$. It also has the advantage of still further eliminating the danger from the exhaust by diluting the same with an excess of air, thereby making the exhaust less dangerous, even though temperatures were not high enough, under some conditions of operation, for the secondary combustion, previously mentioned, to occur. Cool air entering the ports 7 and passing over the hot pipe 8 through the space 9 also has an important advantage in conducting away heat from the exhaust pipe and carrying the same out with the exhaust gases and thereby prevents radiated heat from being carried out through the jacket 12 surrounding the exhaust pipe.

In the form of invention shown in Figure 2, an exhaust conduit 18 is employed which, in proximity to the engine is widened to form an enlarged space 17. The jacket 19 completely encloses the enlarged end of the exhaust pipe and is spaced therefrom to provide an air intake conduit 16. Attached to the wall of the jacket 19 are a series of nozzles 14 which, through the ports 13 in the wall of the jacket, communicate with the exhaust ports of the engine. Between adjacent nozzles, baffles 14a are provided, so that about each nozzle, a restricted space 15 is formed.

In the operation of this form of the invention, the exhaust from a hydro-carbon engine is forced out through ports 13, thence downwardly through nozzles 14, causing a partial vacuum to exist at spaces 15 which, in turn, causes a draft of air to be drawn up through the space 16 and down around the hot exhaust nozzles 14. As the air and hot exhaust gases are intermingled within the space 17 of the exhaust pipe proper 18, a secondary combustion is formed, tending to change the nature of the gas from $CO$ to $CO_2$, as previously described. This modified invention also has the advantage of carrying away heat from the exhaust and preventing radiated heat from being transmitted through the jacket 19 surrounding the exhaust pipes. Bolt holes are provided through the casting, as shown at 20, through which the improved exhaust system may be bolted to an engine.

In the form of the invention shown in Figure 3, a still further modificationn is resorted to. In this form of the invention, the inner end of the exhaust pipe, which connects the remainder thereof through a flange 29, is formed as a venturi 24, a continuation of the inner end of which forms a flaring jacket 27. This jacket, which is adapted for securing to the engine wall, as at 30, has supported therein a nozzle 22, which extends into the venturi and terminates just short of the throat thereof. By means of this arrangement the velocity of the exhaust gas is increased at this point, thereby creating a suction which causes a current of air to enter through the port 7, to flow along the heating chamber or space 9, and enter the exhaust pipe through the port 6. The outer wall of this nozzle is spaced from the Venturi wall to provide a narrow annular passage 25. The nozzle within the casing is provided with a plurality of branches 21 corresponding in number and arrangement with the number of engine ports which the exhaust conduit is to accommodate. These branches are spaced from the outer wall of the jacket and so far as possible from one another, providing a space 28, which space is in communication with the atmosphere through the ports 26 formed in the wall of the jacket and preferably located at the portion of said wall which is most remote from the venturi 24.

In the operation of this form of the invention, the exhaust from the engine is directed at high velocity through the nozzle 22 into the space 24, causing a partial vacuum to exist in the circular space 25 which, augumented by the venturi, causes an indraft of air to enter a plurality of ports 26 in the jacket 27 which surrounds the exhaust pipes. As this air from the outside of the jacket enters through the ports 26 into the space 28, it is highly heated by contact with the hot exhaust pipes 21 and is thence drawn out through the circular space 25 and intermingled with the highly heated exhaust gases emerging from the exhaust pipe nozzle 22 and intermingled in a highly turbulent state in the space 24 and having a tendency to cause secondary combustion of the exhaust gases at this point. As the air flowing through the jacket 27 and over the pipes 21 is in excess of the quantity required for complete combustion, even under favorable conditions, it has a tendency to dilute the gases to a point where they are far less dangerous. A suitable conveyor pipe may be attached to the flange 29 to convey away air and gases.

It will be noted that in each of the forms of the invention above described, a nozzle or nozzles is employed to give an aspirating effect, drawing air into the exhaust chamber at such a point that it is subjected to the flame of exhaust gases passing from the engine ports 4 before they have a chance to die, and that in each case, the air is highly heated by passing about the nozzle or nozzles and in the construction shown in Figures 1 and 2, by its passage about the exhaust conduit. Furthermore, while the invention has been illustrated and described in use in connection with the exhaust system of an internal combustion engine, it will be understood that the principle involved might be employed with the exhaust system of any engine whose exhaust gases were obnoxious or dangerous, and also that various changes and modifications in structure and minor details in the device may be made to meet various changes and requirements without in any manner departing from the spirit of the invention, as herein described and as set forth in the appended claims.

Having described the invention, what I claim is:—

1. An exhausting system for hydro-carbon engines comprising an exhaust port, a nozzle surrounding said port and having its base in contact with said engine, a jacketed exhaust pipe surrounding the nozzle but spaced therefrom, said nozzle extending into said exhaust pipe and forming an aspirator pump during operation of an engine and adapted to draw an oxidizing agent through the exhaust pipe jacket around the nozzle and force the same out through the exhaust pipe with the exhaust gases.

2. In an internal combustion engine, an exhaust pipe having one end adapted to be secured over the exhaust port of said engine, said pipe having a jacket surrounding the same for a substantial distance and spaced therefrom to form a heating chamber and a nozzle integral with the inner end of said pipe and extending into the jacketed portion of the same, the base of said nozzle being in contact with said engine, said pipe terminating at the base of said nozzle at the inner end of said jacket and provided with a flange in contact with said engine, said chamber having induction ports in its outer end and discharge ports in its inner end anterior to the outer end of said nozzle in communication with the exhaust pipe and arranged concentric with the nozzle whereby air will be caused to flow through said chamber counter to the flow of the exhaust and be delivered to the exhaust pipe in a stream concentric with said nozzle.

In testimony whereof I hereunto affix my signature.

CHARLES A. WINSLOW.